United States Patent [19]
Alvarez

[11] 3,828,859
[45] Aug. 13, 1974

[54] METHOD AND APPARATUS FOR PROCESSING SOIL FOR PLANTING

[75] Inventor: Guillermo Diaz Alvarez, Netcong, N.J.

[73] Assignee: Gee-Dee International, Inc., Rockaway, N.J.

[22] Filed: June 27, 1972

[21] Appl. No.: 266,714

[52] U.S. Cl. ............................... 172/50, 404/92
[51] Int. Cl. .................................... A01b 49/02
[58] Field of Search ............ 111/10; 172/1, 48, 50, 172/51; 404/92

[56] References Cited
UNITED STATES PATENTS

| | | | |
|---|---|---|---|
| 1,500,437 | 7/1924 | Burton | 111/10 |
| 2,041,155 | 5/1936 | Stafford | 404/92 |
| 2,139,027 | 12/1938 | McConnaughay | 404/92 |
| 2,159,509 | 5/1939 | Mosel | 404/92 |
| 2,368,331 | 1/1945 | Seaman | 404/92 |
| 2,619,013 | 11/1952 | McEachran | 404/92 |
| 3,011,564 | 12/1961 | Dahlgren | 172/50 |

*Primary Examiner*—Stephen C. Pellegrino
*Attorney, Agent, or Firm*—Clayton F. Smith

[57] ABSTRACT

A method and apparatus which in one single pass can take cleared acreage whether or not previously farmed, and leave the soil with improved texture, substantially free of all harmful weed seeds, insects, insect eggs and larvae and other harmful living matter, and in condition for planting. This is accomplished without the use of herbicides, insecticides or the like. A layer of topsoil of predetermined depth is peeled from the surface and vigorously worked by milling, crushing and other means. Liquid or solid fertilizer may, if desired, be blended into the soil. Seeds may be planted, and the treated soil redistributed to cover them to a preselected depth, all in the one pass.

41 Claims, 14 Drawing Figures

3,828,859

METHOD AND APPARATUS FOR PROCESSING SOIL FOR PLANTING

BACKGROUND OF THE INVENTION

I. Field of the Invention

The present invention is directed to a method and apparatus for removing stones and other objects from the surface of cleared ground, removing a layer of topsoil to a predetermined depth, and treating the soil to remove harmful insects and their eggs and larvae as well as unwanted wild seeds, all without the use of herbicides or insecticides. The present invention also includes a method for upgrading the plant food content and the texture of the soil, blending in fertilizer in either liquid of solid form, if desired; planting seeds if desired, and returning the treated soil to the surface to cover the seeds to a predetermined depth, all in one pass.

II. Prior Art

Ordinary farming methods generally require several different steps and involve separate pieces of apparatus. Although topside weeds, grass, leaves, crop remnants, twigs and animal matter are conventionally "turned under" and mixed with the soil, such methods generally fail to break up such organic matter to a degree sufficient to make it readily available as plant food for the young seedlings. Furthermore, where soil is sandy, full of small stones and of generally poor texture, the farming methods generally employed do little to improve the texture, and the soil remains poor year after year.

The roots and seeds of weeds remain in the soil, only to compete with the crop to be planted. Frequent weeding and cultivation is therefore required.

Insect eggs, grubs, larvae, and harmful insects remain alive in the soil, only to later emerge to plague the farmer and ravage his crop. The usual answer to such devastation, is the application of insecticides which not only are costly to apply, but upsetting to the natural ecological balance.

Because of the difficulties in developing new acreage for the growing of crops, the tendency has been to confine planting to previously cultivated areas which become exhausted and require crop rotation methods and applications of fertilizer while uncultivated land is by-passed. Soils which are considered too sandy or rocky for successful farming are also by-passed.

SUMARY OF THE INVENTION

I have now developed a method and apparatus for converting cleared land to soil of improved texture, substantially free of weed and insect lift. My method can place soil in condition for planting in one pass. At the same time organic matter in the soil such as weeds, roots, grass, leaves, crop remnants, twigs, animal matter, unwanted seeds and insect life are so pulverized that they are no longer a threat to seedlings, but rather become almost immediately available as plant food. Finally, fertilizer may be blended into the processed soil if desired, seeds can be planted, and covered to a preselected depth. Such processing of the soil is achieved by forcing obstructions to one side and/or carrying them along and forcing a leading cutting edge through the ground a selected distance beneath the surface in a plane parallel to that surface, to thus peel a layer of top soil. By continuing the forward motion, this layer of soil is forced through parallel blades cutting it longitudinally and separating stones and objects too large to pass between them. The soil is milled by at least one set of hammers rotating on one or more shafts. These rotating hammers, cooperating with an anvil surface, are adjustably positioned at a distance perferably between about 1/32nd inch and 2 inches from the anvil. Where two or more sets of hammers are employed, they may rotate in the same or different directions, and at the same or different speeds. These rapidly rotating hammers propel the milled earth upwardly, whereupon most of it falls into a conveyor with a small part recycling back to the hammers. The conveyor carries the soil upward to a point from which it is further processed. The soil is crushed between biased rollers and passes to at least one set of rotating hammers similar to the first set encountered by the incoming soil. At any point during this processing, but preferably during the soil's second encounter with rotating hammers, liquid fertilizer may be metered into the soil. Solid fertilizer, lime, or other conditioners may also be blended therein, preferably by means of a screw feeder.

Leaving the hammers, the soil drops to a bidirectional helical flight parallel to the rotating shaft to which the hammers are attached, which delivers all material falling to the right of its midpoint to the right side, and all material falling to the left side of its midpoint to the left side. At the two ends of the conveyor, the soil drops through bottom openings into each of two screw conveyors comprising helical flights rotating in cylindrical tubes which carry the soil to the rear of the apparatus, one along the right side and one along the left side of the machine, and upwardly, to allow further processing of the soil. Preferably the helical flights in at least one of these screw conveyors are interrupted flights, to provide further working of the soil during transport.

At the end of these screw conveyors the soil drops into another bidirectional flight which picks it up and distributes it along the length of at least one set of rotating hammers for further milling. The processed soil from these hammers drops into another bidirectional flight which collects the soil and delivers it to a central opening where it drops to a spinning distribution disc which is covered with a bell shaped housing, the bottom edge of which curves down about the edge of the spinning disc to leave an annular space through which the soil is distributed to the ground, The greater part of the skirt of the bell shaped housing is substantially parallel to the surface of the disc and close to its surface. The housing may be free to rise and fall through a limited distance, parallel to the spinning shaft, so that when sufficient earth is on the upper surface of the spinning disc, it will preferably be pressed by the weight of the cover. The maximum inside diameter of the housing in a crosswise direction is preferably substantially equal to that of the width of the cutting edge at the front end of the machine.

It is preferably to elongate the annulus between the cover and the disc somewhat to insure equal distribution of the soil.

The surface of the disc may have raised ribs extending from the supporting shaft to the edge of the disc, said ribs preferably being somewhat spiralled with the arms of the spiral bending away from the direction of rotation of the disc.

If desired, the spinning distributor may be a foraminous disc.

To deposit the soil in the form of furrows, and thereby to cover seeds to a predetermined depth, flat strips or slats, preferably adjustable as to width and position, are attached beneath the distributor. These slats are placed parallel to the direction of motion. In the case of a foraminous disc, they may extend the full length of the housing, but if the disc is solid, the slats need only extend over the annulus from which the soil will be distributed. Preferably these slats can be added or subtracted, they can butt one another to increase their effective width, or overlap to make such width adjustable. They may also have rounded and upturned ends so they may slip sled-like over the ground should they touch its surface.

DESCRIPTION OF THE DRAWINGS

This description is directed to the accompanying drawings wherein like reference characters refer to like parts throughout the several views.

Figure 1:
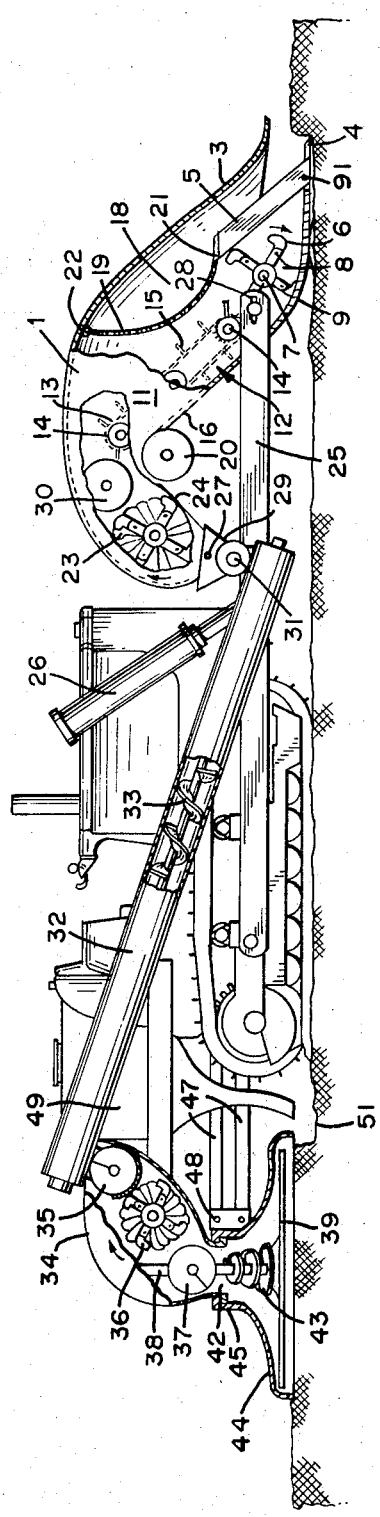
FIG. 1 is a break-away view in elevation, illustrating the complete assembly of one embodiment of my invention, the component parts being attached to, and motivated by a conventional caterpillar tractor.
Figure 2:
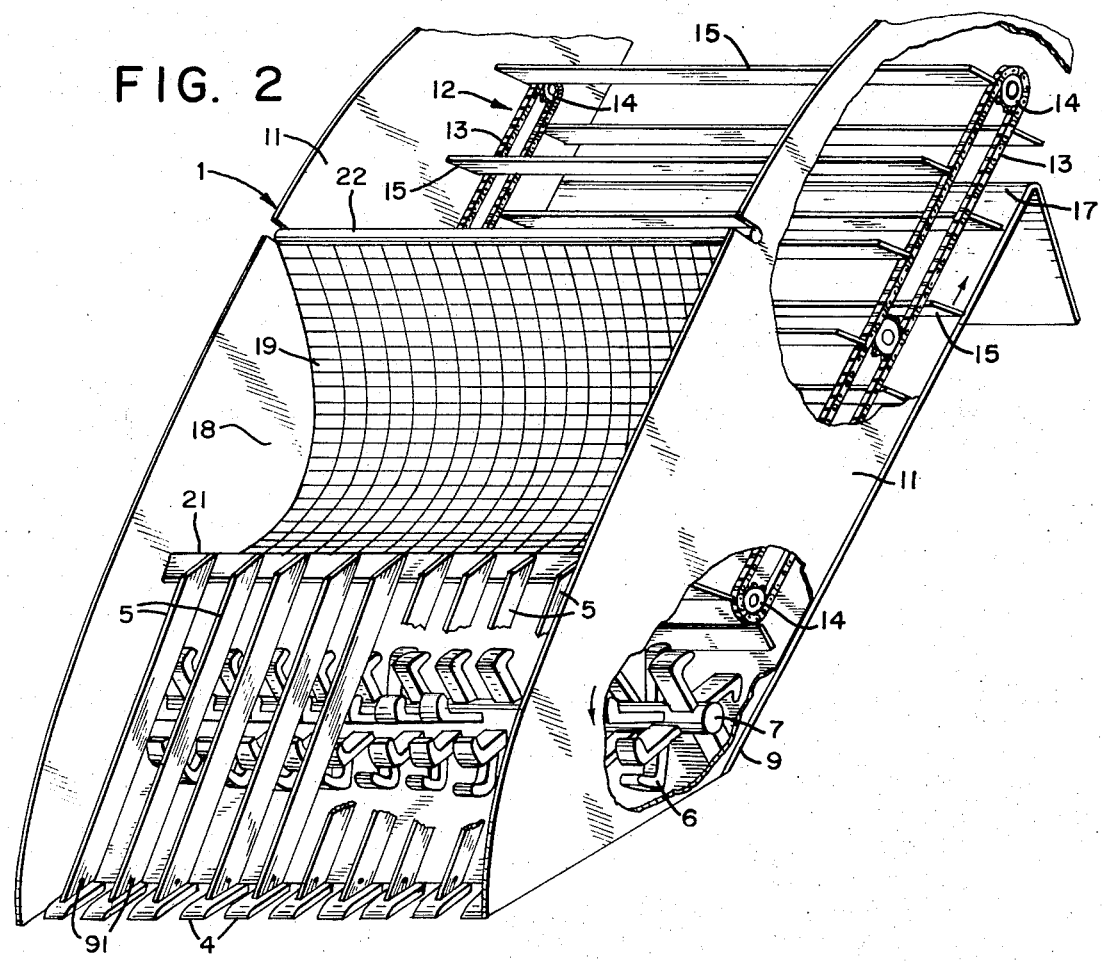
FIG. 2 is a break-away perspective view of the front end of the apparatus with the front cover and forward plow removed.
Figure 2A:
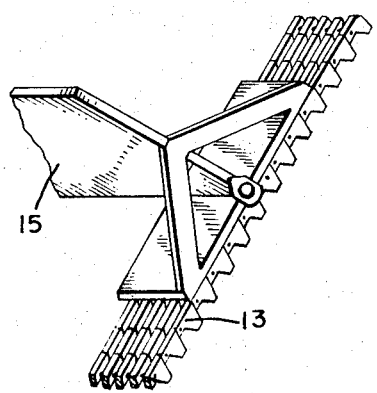
FIG. 2A is an enlarged view of a section of the chain conveyor of FIG. 2 illustrating one method of maintaining the conveyor blades perpendicular to the chain. A belt conveyor would also be applicable in this service.
Figure 3:
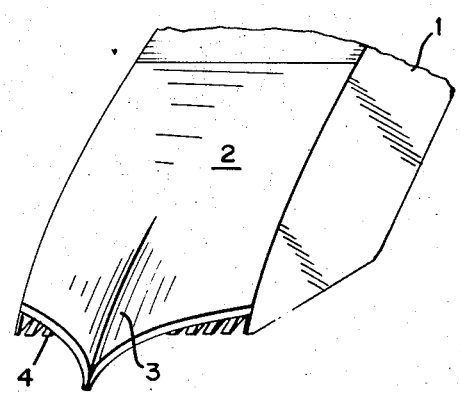
FIG. 3 is another perspective view of the front end, but with the front cover and forward plow attached.

Referring now to one variation of the present invention, as illustrated in FIG. 1, which constitutes a preferred embodiment for preparing soil for planting or other use, and both FIG. 2 and FIG. 3 which illustrates the front end of the assembly of FIG. 1. Numeral 1 illustrates forward section of the apparatus which forces large obstacles to one side, removes a layer of earth to a predetermined depth, partially processes it, raises it to a conveyor which processes it further, and transports it to the rear for still further processing, and distribution. Cover plate 2 encloses the moving members within 1. The forward portion of the cover, 3 has a plow-like configuration, and the structural strength required to force obstacles such as large stones, logs, etc. to one side or the other. Several different modifications of this plow can be employed. This plow, does not enter the ground, but moves on a plane less than about 6 inches above its surface. The plow may be an integral part of cover 2, or separate from it. It may be V shpaed to urge obstructions to either side, or have a straight or curved forward edge set at an angle to the leading face of the machine, to force all obstructions to one side. Furthermore, its angle may be adjustable and controlled mechanically or hydraulically, thus giving the operator a choice as to the side to which the obstacles are to be urged. This is of particular advantage when the machine works back and forth across a field, and the operator wishes to continually urge the obstacles in one specific direction. Cutting edge 4, preferably with teeth of steel or a steel alloy and preferably replaceable, is parallel to the ground. In operation, it is forced forward in a plane parallel to the surface of the earth, but beneath it by a predetermined amount, less than 10 inches, preferably between 3 and 8 inches.

As the apparatus moves forward, the layer of soil removed by cutting edge 4, is forced between blades 5, and within the field of action of the rapidly revolving hammers, 6 which preferably swivel from the revolving shaft 7 to which they are attached. Preferably these hammers are additionally jointed as at pivot points 8. Although the shape of these hammers is not critical, the configuration shown is recommended. The speed of rotation of the shaft carrying the hammers will be regulated according to the characteristics of the soil being processed. Normally the speed would vary between 200 and 500 revolutions per minute (RPM). The bottom portion of housing 1 at point 9 acts as the anvil for the hammers, and is especially thick and substantial. The shaft 7 is journaled into the side walls 11 of housing 1, preferably in journals capable of adjustment. These journals are positioned so that the hammers clear the anvil surface in their circles of rotation by between about 1/32 inch and 3 inches. In addition to the journals being adjustable, they are fitted for limited motion away from the anvil surface, but strongly biased to the position of desired clearance, as by springs, too rigid to respond to slight degrees of imbalance of the rotating hammer assembly, yet sufficiently resilient to allow for any motion caused by an unusually crush-resistant object coming within their area of action. If the shaft carrying the hammers is fitted with pinion gears, an adjusting slot can be employed tracing an arc, such that the driven and driving shafts will remain equidistant at all times. With this design the hammers can be adjusted over a relatively wide range without disturbing the mesh of the driving and driven gear. If a chain drive is used, a straight slot in sidewalls 11, directed away from the anvil surface can be used, and an adjustable idler sprocket coordinated with the adjustment to retain the proper tension. Preferably, the drive can be hydraulic, using positive acting vane pumps and flexible pressure tubing. If this is done, the driving hydraulic pumps follow the shaft in its adjustment. In the drawing, the driving means for the various rotating parts are not shown for there are several types to choose from, and the matter is not critical.

Returning to FIGS. 1 and 2, there is positioned above the hammer mill assembly 6, a conveyor 12, comprising at least two endless chains or belts 13 operating adjacent to each of the two sides 11, of housing 1, engaging sprockets 14 at either end, and carrying substantially flat earth moving scraper-blades 15 which span the chains 13, are attached to the surface of the chains opposite to that which engages the sprockets 14, are perpendicular to the line of travel of the chains and extend substantially the width of the front end of the machine. The sprockets 14 are positioned, preferably on shafts, at least one of which is driven. These shafts are journaled in the opposite walls 11 of the housing. Preferably, one shaft may be powered, the other shaft having its journals arranged in slots and spring biased to maintain tension on the chains 13.

In operation, the plane of the conveyor toward the front or earth cutting end of the machine moves downwardly whereas the plane of the conveyor toward the rear of the machine moves upwardly.

The rear of the housing 1 above the section serving as an anvil for the rotating hammers, constitutes a flat plate 16 slanting upwardly and backwardly therefrom at an angle ranging from about 35° to 60° from the horizontal, to a height above the plane of operation of the cutting edge 4 of at least about 3 feet, preferably between about 4½ to 6 feet with moderate sized machines, and still higher for larger machines.

The conveyor 12 and flat plate 16 are so positioned relative to each other, that the extended edge of the scraper blades 15 are perpendicular to the flat plate 16, and scrape or wipe substantially its full width in their upward travel.

To provide additonal support for the conveyor chains, and to insure that the edge of the scraper blades are held firmly against flat plate 16 in their upward travel, at least one idler sprocket may be journaled into each side wall 11, and positioned to simultaneously engage both sides of the loop of chain, namely that traveling up and that traveling down.

When the device moves forward, cutting edge 4 peels up a layer of earth which is forced between blades 5 and into the field of action of the rotating hammers which mill the earth and because of their rotary motion, project the milled particles upwardly whereby they fall directly through the blades of the conveyor, or by striking other surfaces within the front end of the apparatus, are ultimately deflected between the blades. Such material falls through the blades to plate 16, and is there urged or scraped upward by the moving blades. Since the conveyor extends beyond the upwardly sloping surface of plate 16, the material is scraped over the edge 17 (FIG. 2) and falls to the succeeding area of treatment.

Alternately, the conveyor may consist of a continuous flat flexible loop of belt, substantially as wide as the front end of the apparatus, and having on its outer surface, raised horizontally cleats or horizontal strips. Such a belt may be constructed of rubber, pliable organic polymer or other flexible material reinforced with fabric, cord or metal, and motivated by rollers at the top and bottom of the loop. For additional support at least one roller of similar dimension is positioned within the loop, parallel to those at its top and bottom, to engage both upper and lower inner surface of the belt loop. With this arrangement, which is operable within a relatively small space, the upper belt surface moves upward, rather than downward. The particles of earth propelled by the hammers fall on its inclined upper surface and discharge at the top to fall to the next area of treatment.

Rigid parallel blades 5 are designed to remove stones and other objects too large to be milled by the hammers. These objects may span two or more blades, and as the earth is forced through the blades, and as other stones are similarly trapped, they force the earlier trapped stones further up the blades 5 acting as rails, until said stones eventually fall into receiving area 18 which has as its bottom a heavy screen or curved foraminous plate 19. Although the forward edge of the blades 5 may taper to substantially a knife edge to aid in passage of the soil between them, this knife edge taper may extend a relatively short distance back from the leading edge. Preferably, the balance of the depth of the blade may taper inwardly slightly toward the rear, so that the rear edge of the blade will be relatively narrow. With this design, a stone, just small enough to fit between two blades will not jam, since the space through which it passed, widens as it progresses between them.

Loose particles of earth adhering to the stones will first fall through blades 5, or if remaining until the stones reach receiving area 18, can fall through the openings in plate 19 for combination with the soil being processed.

Plate 19 may be hinged along line 21, or preferably at point 91 to include the blades 5. Edge 22 of plate 19 is movable, so that when cover 2 of FIG. 3 is raised, and edge 22 is moved forward, any stones collected in area 19 may be dumped out of said collecting area. The necessary forward motion of plate 19 is readily accomplished by hydraulic or mechanical means arranged to move edge 22 forward with respect to the front end of the apparatus.

In FIG. 1, two crusher rollers, 20 and 30 are positioned to vigorously press and crush the earth leaving conveyor 12. The upper surface of the lower roller rotates to the rear, as does the lower surface of the upper roller. Their rate of rotation may be adjustable, but generally is related to the rate of operation of conveyor 12, so that the rollers have the capability of passing between them, at least as much earth as is received from conveyor 12. Preferably, one roller rotates at a slightly higher rate than the other to introduce a shearing as well as a crushing action. Normally, these rollers are separated by about an inch, but, as with the hammer shaft, the journals of one roller, preferably the upper, are fitted into slots providing for limited motion of this roller in a direction away from the roller having fixed journals. The floating roller is heavily biased toward its normal position relative to the fixed roller, preferably with heavy springs or hydraulic biasing means so that the rollers may separate somewhat to accomodate the passage of a large volume of soil, or an object resistant to their crushing action. Preferably, these rollers which may be single units, or in sections, extend substantially the full width of the front end of the apparatus. They may vary in diameter from about 8 inches in relatively small machines, up to about 36" in large machines. Their surface may be corrugated, ribbed horizontally, angularly, or in herring bone fashion. Gentle horizontal corrugations are preferred, however, with spring biased scrapers to free them of adhering particles as they revolve.

Other types of crushers may be used, but rollers are preferred because of their ability to handle a large quantity of earth rapidly.

As the crushed earth leaves the rollers it may be subjected to further milling. In FIG. 1, rotary hammers 23 are shown, acting against anvil surface 24. These hammers are similar in design to rotary hammers 6.

The entire front end of the machine is raised or lowered by supports 25 controlled by hydraulic cylinders 26, there being a support and cylinder on each side. The front end may thus be independently controlled, or alternately, the front end may pivot at point 27, utilizing a slotted opening at 28 to permit this very limited swinging motion.

The milled earth leaving the hammers drops into troughlike hopper 29. Trough 29 extends substantially the width of the front end of the apparatus. The bottom portion of the trough constitutes a bidirectional screw conveyor having a cylindrical cross section 31 within which operates a horizontally disposed helical flight assembly. This helical flight is preferably fabricated on a single horizontal shaft journaled at each end for rotation. The direction of the pitch of the flight reverses direction at the midpoint, however, and is so related to the selected direction of rotation, that earth falling into the flight to one side of the midpoint of the flight is urged away from the midpoint on that side, and earth falling to the other side of the midpoint is urged away from the midpoint on that other side. Beneath each end of this helical two directional flight, the trough communicates with the feed end of a unidirectional screw conveyor 32, set at substantially right angles to the first. This conveyor comprises a cylindrical tube containing a rotating helical flight 33, which conveys the earth entering it at its lower front end, toward the rear and upwardly, so that the earth conveyed is moved to the rear of the tractor, and simultaneously to a height of from 4 to 7 feet for a moderate sized machine, and even higher, for larger machines.

At the rear and upper end of these two screw conveyors, they are in communication with the rear processing chamber 34, one communicating with one end of the chamber, and one with the other. Earth falling into this chamber drops into a foraminous semi cylindrical trough 35 within which there turns another bidirectional helical flight, rotating in a direction to move earth received in the trough from screw conveyors 32 toward the center. In consequence of the foraminous trough in which it rotates, however, it serves to distribute the earth through the openings in the trough and by spilling over its sides, along the width of the rear processing chamber. In the embodiment shown, the distributed earth from foraminous trough 35 is milled by still another set of rotating hammers 36.

The milled earth leaving these hammers falls into another bidirectional screw conveyor 37. Unlike the other two bidirectional conveyors, this is in two sections, each section being journaled into a sidewall of the rear processing chamber 34 at one end, but into an internally supported journal 40 at the other, to thus permit the rotating shaft 38 of the distributor disc 39 to pass between them. This two sectional conveyor collects the earth falling into the bottom of the rear processing chamber, and urges it to the center where it drops through throat 42 onto spinning distributor disc 39. This disc is just above the surface of the ground and operates in a plane parallel to said surface to distribute the processed earth by centrifugal action.

Preferably one or more of the screw conveyors described, and particularly the two longitudinally operating conveyors have discontinuous helical flights as illustrated in FIG. 1, numeral 33. The resulting process of tumbling the milled earth, dropping it, and picking it up again provides further working of the earth, which is desired.

Figure 4:
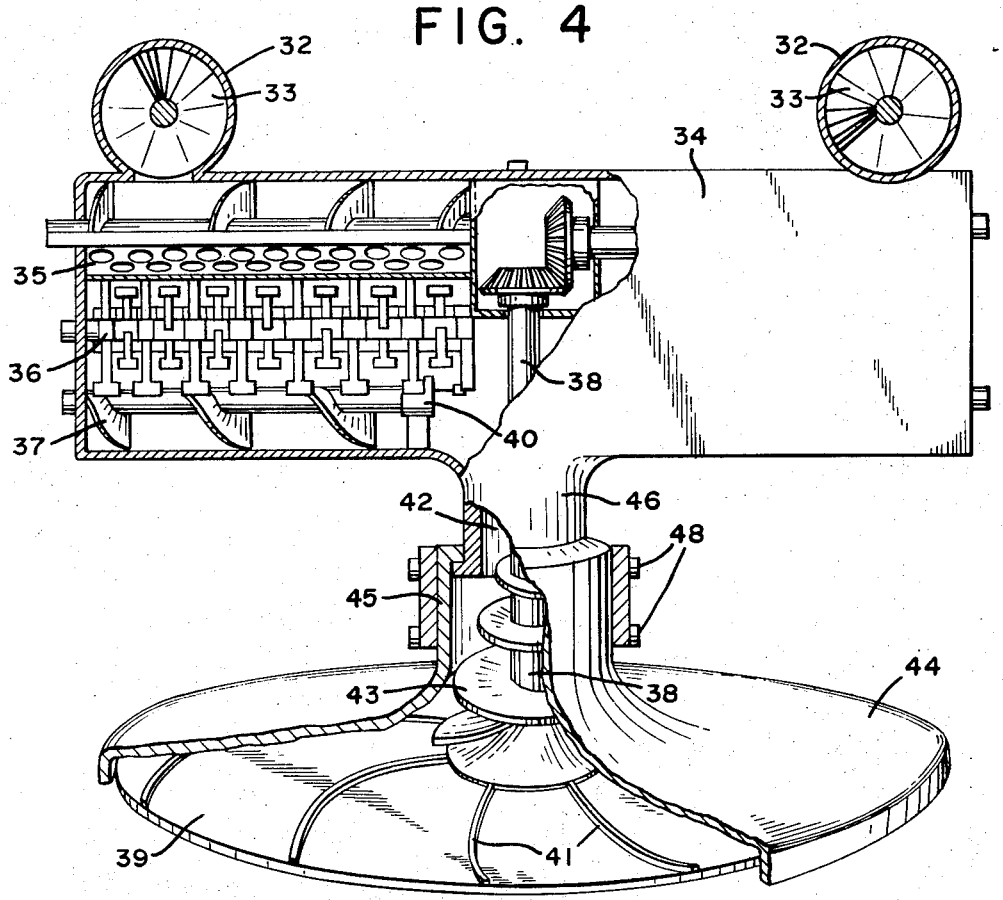
FIG. 4 is a break-away perspective view of the rear section of the apparatus as viewed from the front. The adjustable slats which attach to the bottom of the earth distribution assembly are shown separately for clarity as FIG. 4A. This is an inverted plan view as seen from the bottom.

The upper surface of distributor disc 39 may have raised ribs 41, preferably extending upwardly from the surface about ⅛ inch, or more if desired, and spiraling away from the direction of rotation of the disc (FIG. 4). If desired, the spinning disc may also be foraminous.

The rotating shaft 38 which terminates at its lower end in the distributing disc may also be fitting with a helical flight 43 to prevent any bridging of the milled earth in throat 42.

The distributing disc, helical flight and supporting shaft is covered with a bell-shaped cover 44. Preferably this cover is heavily constructed and is free to rise and fall to a limited degree, with collar 45 sliding along the exterior surface of throat 46.

In FIG. 1, long parallel supporting members 47 pivot at both ends, as at point 48, to permit the limited horizontal motion of bell 44. Being parallel, they keep the axis of bell 44 perpendicular. Although theoretically they describe an arc in their swing to accomodate the vertical motion of the bell, their length is so great relative to the limited vertical motion of the bell, that the slight sideways motion caused by the arc is not appreciable, and is accomodated by the looseness of collar 45 about the exterior surface of throat 46. Of course, other means of supporting the bell to provide for this slight vertical motion, if said vertical motion is desired, may be employed; for example, the upper cylindrical portion of the bell may be elongated and fitted into an encircling sleeve in which it may vertically slide or move by means of roller bearings. When there is sufficient build-up of milled earth under the bell, then the weight of the bell will press on the earth beneath it, thus adding further to the working of said earth, which is desirable.

Figure 4A:
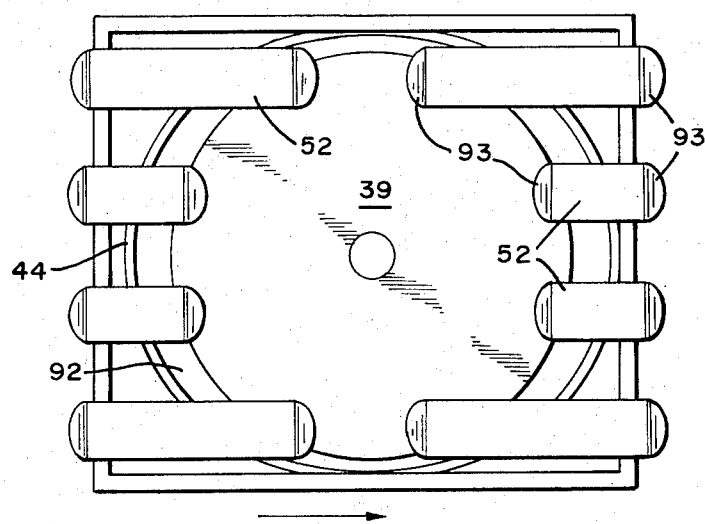

Preferably at a point behind the tractor, but in front of the earth distributing assembly, there is at least one conventional seed bin and seeding device 49. If desired, seeds from this conventional equipment may be deposited on the earth at point 51 (FIG. 1), from which the upper surface has been stripped, to subsequently be covered by earth distributed by rotating distributing disc 39 that follows. To deposit the soil in the form of furrows and thereby to cover seeds to a predetermined depth, slats, preferably being adjustable as to width and position, are attached beneath the spinning disc, and particularly beneath the annular space between the bell shaped housing and the disc. FIG. 4A is a view of the distributor assembly as seen from beneath. Slats 52 are placed parallel to the direction of motion of the apparatus. In the case of a foraminous disc they may extend the full width of the bell housing 44 but if the disc is solid, the slats 52 need only bridge the space across the annulus 92. Preferably these slats may be added or substracted, they can butt one another to increase their effective width, or overlap to make such width adjustable and they may have rounded and upturned ends 93. The effective width and the number and spacing of these slats may be preset. The effect is to divert the soil falling on them so as to distribute the processed earth in furrows and to position these furrows with respect to the deposited seeds so as to cover them with a preselected depth of earth.

Figure 5:
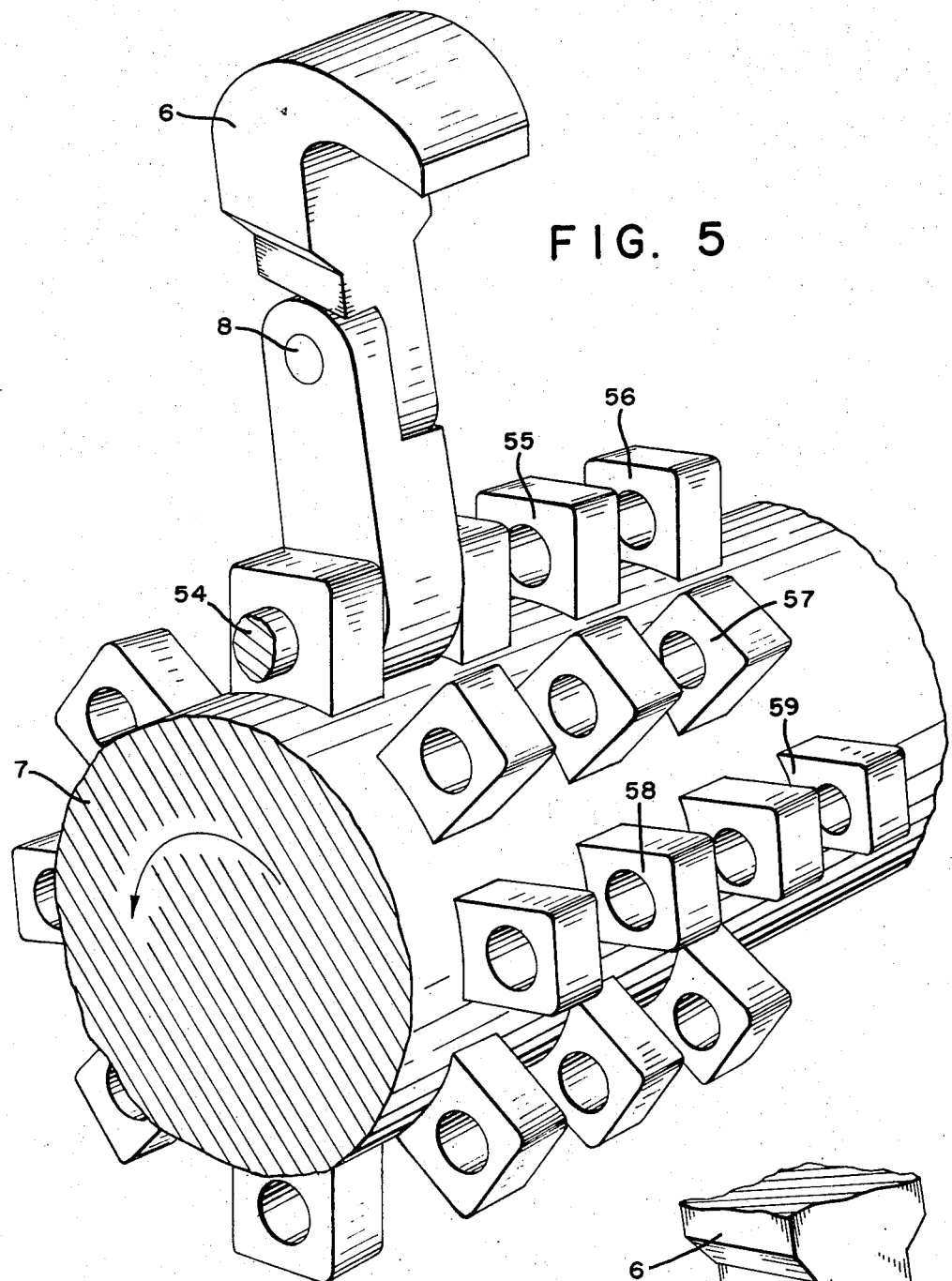
FIG. 5 is a perspective view of a section of a rotating hammer assembly with one articulated hammer attached.

FIG. 5 illustrates a preferred design of hammer such as those used in assemblies 7, 23 and 36 of FIG. 1. One hammer is shown, fitted for limited rotation about pin 54. The width of the hammer head 6 is such that if a hammer was installed in space 55, the hammer heads would just clear each other. For best results, however, in the assembly of FIG. 5, it is preferable to position hammers within the spaces 56, 57, 58 and 59, thus the hammers of alternate rows are staggered.

Figure 5A:
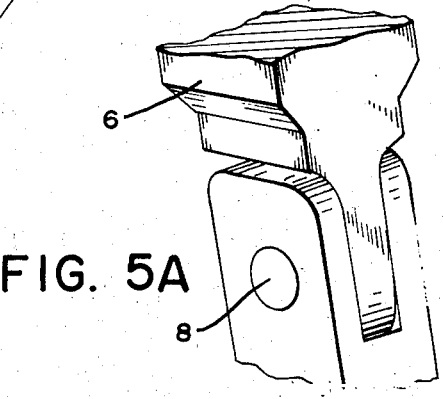
FIG. 5A depicts an alternate clevis-type swivel arrangement for the hammer head.
Figure 6:
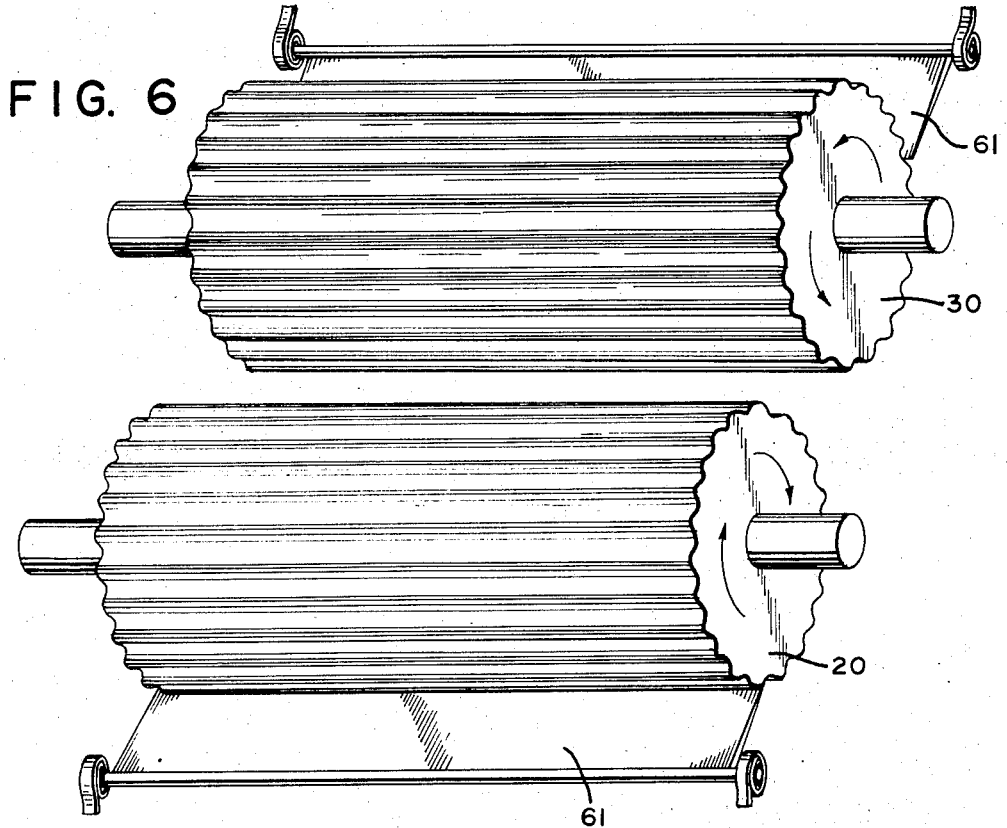
FIG. 6 is a perspective drawing illustrating one way in which the crusher rollers can be designed with a gently corrugated surface. Spring biased scrapers are shown, designed to remove adherent mud and clay.

Optionally, the hammers may have a second joint 8, for improved performance. The hammer head of FIG. 5A, and the corresponding swivel joint of FIG. 5B illustrate two different methods of fabricating this joint, with that of FIG. 5A being preferred, FIG. 6 illustrates a preferred design of the crusher rollers 20 and 30, also shown in FIG. 1. Preferably they have a corrugated surface with corrugations parallel to the axis of the rollers. These corrugations are not deep or angular enought to retain mud in their indentations, yet sufficient to prevent crushable objects from riding the rollers at the nip, rather than passing between them. They rotate rapidly enough to pass all the soil delivered to their nip, and preferably, one roller rotates at a slightly faster rate than the other to increase their milling and shearing action.

Also shown are two spring biased scrapers 61 to ride the surface of the rollers, following their corrugations, to thus keep them free of adhering particles.

Figure 7A:
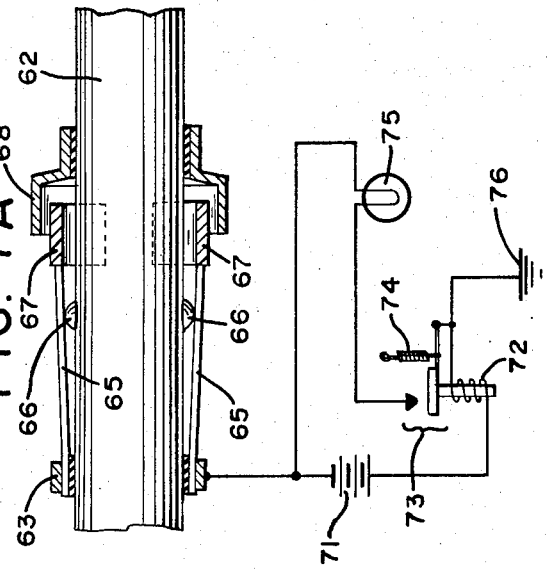
FIG. 7A is a cross sectional view of the same switch incorporated into a wiring diagram, illustrating the manner in which the inadvertent stoppage of rotation of a shaft to which the switch is attached, will alert the operator by switching on a dashboard light or other electrically responsive signal.
Figure 7:
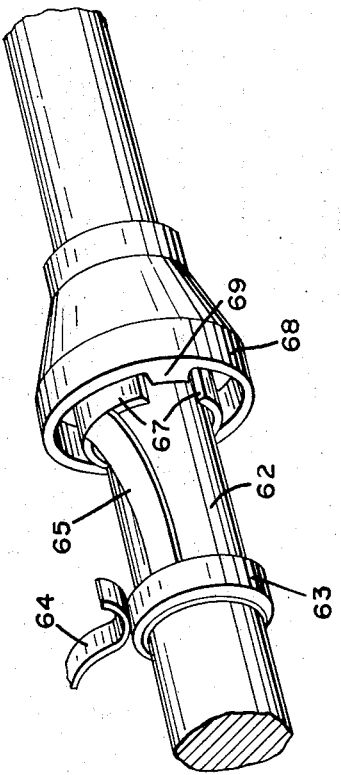
FIG. 7 is a perspective view of a design for a centrifugal switch, maintained in open position by the rotary motion of a shaft.

FIG. 7 and the cross sectional view 7A illustrate one of many ways in which an operator could be altered should any one of the several rotating shafts of the apparatus of the present invention jam. Shaft 62 is fitted with a conducting ring or commutator 63 which is insulated from the shaft and is contacted by electrical shoe 64. Attached to the conducting ring and therefore also insulated from the shaft are conducting metallic spring strips 65 normally contacting switch points 66 on the shaft, and carrying weights 67, preferably contoured to the curvature of the shaft. At rest, the centrifugal switch is in closed position with insulated commutator 63 grounded against the shaft at points 66. The moment the shaft begins to revolve, however, centrifugal force lifts weights 67 away from the shaft against the tension of spring strips 65, thus breaking the circuit by separating strip 65 from switch point 66.

Retaining ring 68 is also insulated from shaft 62, and retains weights 67 against their tendency to fly outwardly by centrifugal force. The moment the shaft stops rotating, the centrifugal switch is closed in consequence of spring strips 65 snapping back into contact with points 66. Inner projections 69 from the retaining ring give side support to the weights in their extended position in case the rotating shaft suddenly stops. FIG. 7A also includes a diagram of one of the several ways in which the switch can be used to alert the operator to the fact that one or more shafts are not rotating.

Several different ways of using the switch are apparent. All switches can be wired in parallel, in a circuit including an electric current source and a signal bulb or other signaling device. When the machine is stationary, the signal bulb is lighted. Normally when the machine moves, all switches will be open and the signal light will be off, indicating normal operation. If the bulb goes on, it indicates that one or more shafts are not rotating. The operator must then find the offending shaft.

Alternately, each switch can have an independent circuit and signal light, then an unlighted signal indicates the exact source of the trouble.

The diagram represents this type of arrangement with still another variation. An electromagnetic relay is included to reverse the action. With this circuit, the light goes on, when the shaft is rotating. The same effect could be obtained without a realy, but insulating the contact point 66, and making the retaining ring 68 electrically conductive with respect to the shaft.

In the diagram of FIG. 7A 71 represents the vehicle battery, 72 a relay with contact switch points 73 out of contact as a result of the activation of electromagnet 72, with the centrifugal switch in the closed position.

The signal bulb 75 lights when the switch points 73 are closed. The circuit is completed at 76 where it is grounded to the frame of the apparatus.

Figure 8A:
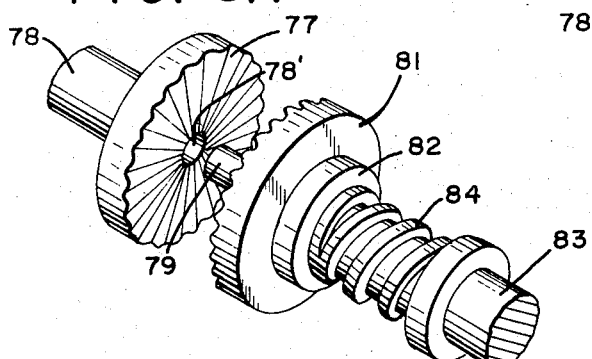
FIG. 8A is a perspective view of one type of slip clutch that can be used on the various shafts to protect the equipment from damage in case of jamming. Although ordinary clutch facing may be used, corrugation of the cooperating metal clutch discs will increase their resistance to slippage, and when slippage does occur, the operator will be aware of this fact, from the sound produced.
Figure 8B:
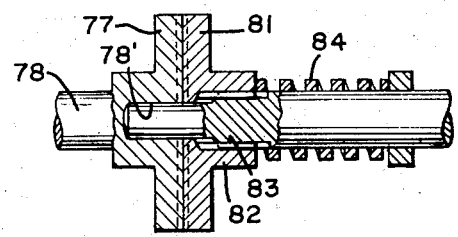
FIG. 8B is a cross sectional view of the clutch design of FIG. 8A. Such a safety slip clutch can be employed if the shafts are driven by gears or chains.

FIGS. 8a and B illustrate one type of safety slip clutch that can be employed to protect the mechanism. When the various shafts are driven by gears or chain, a clutch may be included on each shaft where danger of jamming exists.

Clutch disc 77 is fixedly attached to shaft 78. In the center of the face there is located an opening 78 to accept alignment pin 79. The face of clutch disc 77 preferably has radial. corrugations to match similar corrugations in cooperating clutch disc 81, so that each raised corrugation of one fits into a depressed corrugation of the other, and the two become contiguous.

Clutch disc 81 which includes collar 82 slips easily on the end of shaft 83, but is not rotatable with respect to said shaft, but rather is splined to it, so that it is slideably fitted for limited longitudinal motion. In operation, when the clutch discs are contiguous, and disc 77 is driven, it drives shaft 83 because of contact of the clutch faces, movable disc 81 being strongly biased against disc 77 by spring 84. In the event that shaft 83 is stopped, spring 84 allows moving disc 77 to slip over stationary disc 81. A very considerable force would be required to do this because of the heavy spring and the matching corrugation, however slippage would result before a force sufficient to break the equipment could occur. Finally, because of the corrugations, the sound and vibration would alert the operator to the source of the difficulty.

Figure 9:
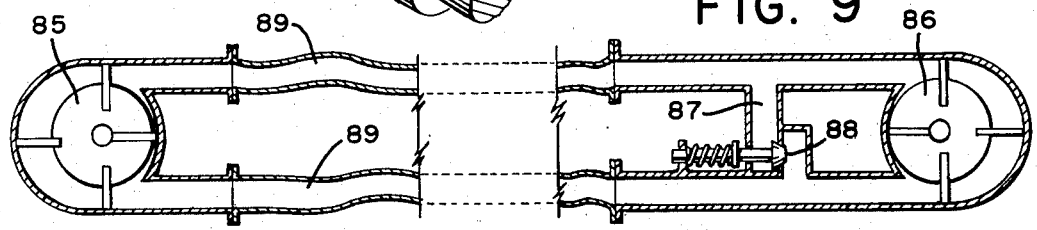
FIG. 9 is a plan view, representing a driving and a driven positive-acting rotary pump, connected by pressure tubing which may be flexible, so that a first power driven pump may hydraulically operate a second pump, attached to a shaft to be rotated.

Although power to the various shafts used in the operation of the apparatus of this invention may be transmitted by gears, shafting, sprockets and chains, another preferred method involves the use of positive acting pumps, such as rotary vane pumps which are driven, to thereby transmit hydraulic fluid under pressure through fixed or flexible high pressure tubing to similar rotary vane pumps or more correctly because they are driven, hydraulic rotary vane motors, which then transform the energy to rotary motion at the point needed, and return the hydraulic fluid to the driving pump. This arrangement is presented in FIG. 9 with rotary vane pump 85 being the driving pump, and vane pump 86, the driven pump. A by-pass 87 is fitted with pressure relief valve 88, which eliminates the need for clutches on the shafts when a hydraulic system is used. Flexible pressure tubing 89 can carry fluid under pressure to any point of the apparatus.

DESCRIPTION OF THE PREFERRED EMBODIMENT

The drawings have been directed to a preferred embodiment in which the apparatus has been added to a caterpillar tractor. It is to be understood, however, thay my invention is not limited to this arrangement. It may be attached to any type of tractor or earth moving equipment, both those that operate with pneumatic tires, metal wheels with cleats as well as those with caterpillar treads. Its moving parts may be powered by the engine of the tractor or earth mover. It may if desired be arranged so that the velocity of its rotating parts ar related to the velocity of the vehicle, but preferably the power to the rotating parts is independent of the rate of locomotion. Whereas the rotating parts may be controlled by a clutch, it is preferable to have this clutch independent of the driving clutch, so that the motor, when idling as well as when moving the vehicle, will be rotating the moving parts of the apparatus of the present invention unless disengaged by the operator. Alternately, the apparatus can be driven by an independent power source. When this arrangement is used, a clutch is preferably positioned between the power source and the rotating parts of the apparatus. If desired, a transmission may also be used for varying the speed of rotation with the character of the soil and other circumstances, to thereby augment the range of velocities that may be achieved through the controlled throttling of the engine. Thus where one type of soil might be suitably processed with the rotating hammer assemblies rotating at 500 rpm, the use of a transmission having a 1:4 ratio could, if desired, raise the speed of rotation to 2000 rpm.

Where power is transmitted to the rotating parts hydraulically as by using positive acting rotary pumps, powered by one or more master pumps, a clutch can be eliminated in favor of a by-pass valve, whereby part or all of the hydraulic fluid can be circulated without sending it through the driven pumps.

It is not necessary that the apparatus of the present invention be integrated with a vehicle such as a tractor. It may be a completely independent apparatus with its own motive power, with rotating parts driven by the motor driving the apparatus, or by an independent motor. The device may also be designed, if desired, without motive power for pulling or pushing, by a second vehicle, by cables, or other means.

Finally, it is not intended that the apparatus must operate with all the members discussed, nor need it be limited to these.

The apparatus of the present invention will process soil along a swath by means of a continuous mechanical operation. The interposition of a crushing and compression operation between the first and subseqeunt milling operations is an important concept. Not only does the arrangement add to the destruction of harmful plant and insect life in the soil, but it crushes many of the small stones that pass the first milling operation. This provides crushed particles for further milling, improved soil texture and freshly exposed mineral matter having greatly increased surface area, to meet the mineral requirements of crops planted in the processed soil. The apparatus of the present invention will also improve the quality of sandy soil for planting, by increasing the proportion of finer particles through the attrition of pebbles and sand particles. When the optimum texture has been obtained however, it may be substantially maintained during subsequent passes, by increasing the clearance between the rotating hammers and anvil surfaces. It might be assumed that increasing the clearance would significantly reduce the effectiveness of the apparatus in ridding the soil of harmful insects and in reducing contained organic matter to a more readily available form. Actually, the impact of the hammers conducted through the soil accomplishes the desired effects even when the clearances used are substantial.

While I have described a preferred embodiment of my invention, it will be understood that various modifications and changes can be made in the apparatus and in the method of its use without departing from the spirit of this invention or the scope of the following claims.

I claim:

1. An apparatus for processing soil along a swath in a continuous mechanical operation comprising:
  a. a housing having a cover plate, substantially parallel sidewalls, and a bottom portion, said bottom portion comprising a scoop, said scoop having a forward lip constituting a cutting edge substantially parallel to the surface of the soil to be processed, but adjustable to a preselected depth beneath said surface by controlled adjustment of movable support members linking the housing with a driving vehicle;
  b. said driving vehicle attached to the housing urging the forward lip of the scoop through the soil, whereby a layer of earth is continuously peeled and enters the scoop;
  c. a multiplicity of free swinging hammer means pivotally extending from a first power-driven shaft journaled in the sidewalls of the housing, comprising a rotating hammer means assembly, said hammer means being spaced from said bottom portion of the housing, adapted to serve as a cooperating anvil surface, said hammer means rotatable in a direction to strike the earth urged into the scoop, momentarily compress and mill it in the space between the hammer means and the anvil surface of the bottom portion of the housing and drive it upwardly and backwardly toward the rear of the housing;
  d. at least one additional rotating assembly similarly spaced, comprising a multiplicity of free-swinging hammer means pivotally extending from a second power-driven shaft, journaled in the sidewalls of the housing behind and parallel to the first;
  e. means mounted on said housing for transporting the soil from the first rotating assembly to the second rotating assembly; and f. means mounted on said housing for distributing the processed soil to the swath from which it was removed.

2. The apparatus of claim 1 wherein the housing is pushed by the driving vehicle, and power for the rotating assemblies is transmitted mechanically thereto from the driving vehicle.

3. The apparatus of claim 1 wherein the housing is pulled by the driving vehicle, and power for the rotating assemblies is transmitted mechanically thereto from the driving vehicle.

4. The apparatus of claim 1 wherein the driving vehicle for urging the scoop forward and moving the housing is a tractor or earth mover with which the housing is integrated, said housing being adjustable with respect to the tractor, for urging the cutting edge of the scoop through the soil at a preselected depth beneath its surface.

5. The apparatus of claim 1 including a forward-extending plow mounted on a forward portion of the housing which remains at all times at a distance of less than about 6 inches above the surface of the soil, whereby the rotating assemblies within the housing are protected from large stones and other surface objects.

6. The apparatus of claim 5 wherein the plow is positioned so as to present a straight leading edge in front of the scoop, and adjusting means attached to the forward part of the housing are included to adjust the position of the plow with respect to its elevation above the surface of the ground and its angle with respect to the line of travel of the apparatus.

7. The apparatus of claim 1 wherein the cutting edge is equipped with teeth to facilitate the movement of the cutting edge through the soil.

8. The apparatus of claim 1 wherein a plurality of parallel blades are positioned on a forward portion of the housing, and forward of said hammer means, to cut the peeled soil into parallel strips as it is forced between them, said blades being angled backwardly from the cutting edge, whereby stones and other objects too large to pass between them will be forced upward, the blades acting as rails for their upward travel.

9. The apparatus of claim 8 wherein a receptacle is hingedly mounted on the housing at a position above said blades, for receiving stones and other objects forced upwardly on the parallel blades, and means on the driving vehicle for powering said receptacle for forward movement, are included whereby objects received and retained within the receptacle may be discharged when desired.

10. The apparatus of claim 1 wherein the cutting edge of the scoop is adjustable for distances up to and including about 10 inches beneath the surface of the earth.

11. The apparatus of claim 10 wherein adjustable mechanical means link the housing supports and the driving vehicle whereby the depth of the cutting edge beneath the surface of the soil can be adjusted and maintained.

12. The apparatus of claim 11 wherein the adjustable mechanical means linking the housing supports and driving vehicle are hydraulic cylinders, whereby the depth of the cutting edge beneath the surface of the soil can be adjusted.

13. The apparatus of claim 1 wherein the multiplicity of hammer means pivotally attached to the rotatable shafts are arranged to cooperate with anvil surfaces on the upper surface of the scoop, said shafts being journaled in substantially vertical elongated openings in the sidewalls of the housing, and adjustable for maintenance in any selected horizontal position within the elongated openings, whereby the free swinging hammer means may be set to clear the anvil surfaces by distances ranging from about 1/32 inch to 3 inches.

14. The apparatus of claim 13 wherein the shafts are rotatable in bearings, slidably fitted into the elongated openings in the parallel sidewalls, and are maintained in any selected position within the limits of the elongaged openings.

15. The apparatus of claim 14 including means strongly biasing the shafts journaled in the elongated openings downwardly toward the anvil surfaces, said means being adjustable to thereby maintain the rotatable shafts in any selected position, while providing sufficient resilience upwardly against the bias to allow the hammer means to pass large resistant objects without damage to the apparatus.

16. The apparatus of claim 13 wherein the hammers have at least one swivel joint in addition to that at the point of attachment to the rotating shaft.

17. The apparatus of claim 1 wherein means for transporting soil from the first rotating assembly to the second rotating assembly, when the two assemblies are substantially adjacent, is provided by the first rotary assembly itself, by virtue of its high rotary velocity.

18. The apparatus of claim 1 wherein the means for crushing and compressing comprise at least two driven, rotatable rollers which cooperate to compress and pass soil between them, are adjustable with respect to the distance between them and are strongly biased toward the point of adjustment, said rollers being journaled in the parallel sidewalls of the housing, with at least one roller being a movable or floating roller, journaled in elongated openings in the sidewall, said elongated openings extending substantially in a line with the journals of the cooperating roller, said floating roller being maintained at a preselected position between the elongated openings, by adjusting means, attached to the sidewalls of the housing adjacent to the journals, said floating rollers being biased toward the cooperating roller to said point of adjustment, whereby an extraordinary force applied to separate the rollers by a crush resistant object passing between them opposes the bias to override the adjustment position and protect the apparatus.

19. The apparatus of claim 18 wherein the adjusting means are mechanical, and the bias is supplied by springs mounted on said housing.

20. The apparatus of claim 18 wherein both the adjusting means and the bias are supplied by hydraulic cylinders.

21. The apparatus of claim 18 in which the surfaces of the rollers are uneven.

22. The apparatus of claim 18 in which the speed of rotation of one roller exceeds that of the other to thereby provide a shearing action at the nip.

23. The apparatus of claim 18 in which the surface of the rollers have undulations or corrugations parallel to their axes, and scrapers attached to the housing which are spring biased in contact with the rollers to thereby cause them to follow the undulations and keep them free of adhering accumulations.

24. The apparatus of claim 1 wherein the means for milling comprises at least three rotating assemblies with freeswinging hammer means, at least one of which rotates in a direction counter to the direction of rotation of at least two others.

25. The apparatus of claim 18 including a conveyor mounted within said housing to transport the milled soil to the rotatable rollers.

26. The apparatus of claim 4 including at least one powered helical flight conveyor mounted on the side of said driving vehicle to convey processed soil from the housing to a location at the rear of the driving vehicle, for further processing and distribution.

27. The apparatus of claim 26 in which said helical flight conveyors are two in number, mounted on opposite sides of the driving vehicle, said apparatus including a powered bidirectional helical flight axially rotatable for outward transport from substantially its midpoint and mounted to the rear of the housing, positioned to communicate with said helical flight conveyors whereby processed soil in the housing entering the first bidirectional flight conveyor is distributed to the two helical flight conveyors and thence to the rear of the driving vehicle for further processing, and distribution to the swath.

28. The apparatus of claim 27 including an additional powered bidirectional helical flight conveyor mounted adjacent to the discharge end of the helical flight conveyors, said bidirectional flight being axially rotatable, for inward material transport toward its midpoint, whereby processed soil collected from the two helical conveyors is delivered to the upper surface of a spinning disc positioned at the rear of the driving vehicle for distribution to the swath.

29. The apparatus of claim 28 wherein at least two of the helical flights are interrupted flights.

30. The apparatus of claim 28 wherein said spinning disc is supported by a rotating shaft on the driving vehicle powered for turning the spinning disc said shaft having attached thereto a helical screw to aid in delivering the processed soil to the upper surface of the disc.

31. The apparatus of claim 28 wherein the spinning disc is covered by a second housing mounted at the rear of the driving vehicle, and having a throat for the passage of the processed soil to the disc, said housing being partially open at the bottom to provide an annular space around the disc for distribution of processed soil.

32. The apparatus of claim 31 wherein the annular space surrounding the disc is sufficiently elongated in the direction of travel of the apparatus to substantially equalize the distribution of the soil.

33. The apparatus of claim 28 wherein the surface of the spinning disc has raised ribs radiating outwardly from the upper surface thereof.

34. The apparatus of claim 31 wherein the second housing is arranged for limited vertical motion, with the lower limit being just above but not touching the spinning disc, whereby the housing will press the soil on the disc by virtue of its weight, to thereby increase the working of the soil.

35. The apparatus of claim 28 wherein the disc is foraminous.

36. The apparatus of claim 31 wherein slats, adjustable in number, width, and arrangement are positioned at the bottom of said second housing beneath the annular space, said slats being readily attachable or removable to transverse supports mounted on the second housing, in any desired arrangement parallel to the direction of motion of the vehicle, the effective width of the slats being varied as desired by butting or overlapping, to thereby allow the deposition of the distributed soil to the swath in furrows of predetermined number, depth and width.

37. The apparatus of claim 1 in which a plurality of the rotating shafts are rotated by hydraulic, positive acting, rotary vane motors, by fluid pumped through hydraulic fluid lines, by one or more master, positive acting rotary vane pumps, powered in turn by the driving vehicle, said rotary hydraulic motors being controlled by at least one valve-controlled hydraulic by-pass line.

38. The apparatus of claim 37 wherein relief valves are positioned in the hydraulic fluid lines to the driven hydraulic motors for discharge of hydraulic fluid into lines by-passing the motors, when said relief valves are subjected to excessive pressure, whereby the rotating shafts are protected from excessive strain.

39. The apparatus of claim 37 wherein the hydraulic fluid lines comprise in part, flexible pressure tubing whereby the driven hydraulic motors can be used on adjustable rotary shafts.

40. The apparatus of claim 1 wherein a centrifugally operated electric switch is positioned on at least one rotating shaft, and connected in a circuit with a signal device whereby the operator is alerted if the rotation of the shaft is stopped.

41. An apparatus adapted for processing earth along a swath in one pass, and in a continuous mechanical operation comprising:
 a. a housing, the bottom portion of which comprises a scoop having a forward lip constituting a leading cutting edge substantially parallel to the surface of the earth to be processed, said housing being adjustable so as to maintain the leading cutting edge at a predetermined depth beneath the surface of the earth to be processed by controlled adjustment of movable support members connecting the housing with a power driven vehicle for urging the scoop and leading edge forward;
 b. a first power-driven hammer means pivotally mounted so as to be free swinging, extending outwardly from a first shaft, said shaft being journaled horizontally in sidewalls of the housing transversely of the direction of travel of the apparatus, said hammer means being capable of crushing, compressing and milling the earth entering the scoop and passing beneath the rotating hammer means in the direction of their rotation in the space between the hammer means and the bottom of the housing adapted to serve as a cooperating anvil surface;
 c. at least one additional driven shaft parallel to, but behind the first, journaled horizontally in the sidewalls of the housing transversely of the direction of travel of the apparatus, said shaft similarly carrying additional pivotally mounted free swinging hammer means for further processing the earth passing the first free swinging hammer means; and
 d. an opening in the rear of the housing for the exit and distribution of the processed earth to the swath from which it was removed.

* * * * *